Figure 1:
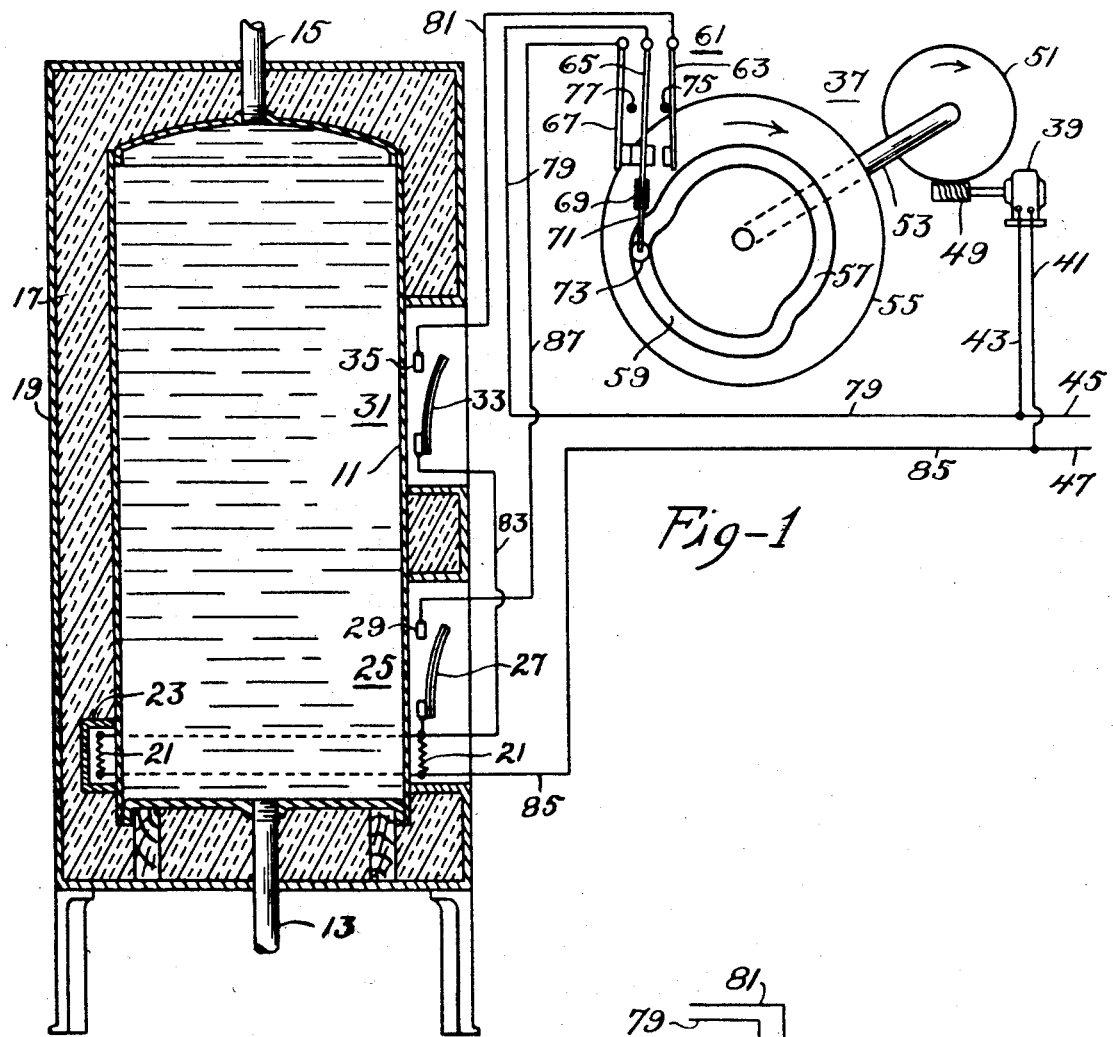

Dec. 16, 1941.   C. M. OSTERHELD   2,266,254

WATER HEATING SYSTEM

Filed Jan. 30, 1941

INVENTOR
CLARK M. OSTERHELD
BY
ATTORNEY

Patented Dec. 16, 1941

2,266,254

UNITED STATES PATENT OFFICE 2,266,254

WATER HEATING SYSTEM

Clark M. Osterheld, Stoughton, Wis., assignor to McGraw Electric Company, Elgin, Ill., a corporation of Delaware Application January 30, 1941, Serial No. 376,580

1 Claim. (Cl. 219—39)

My invention relates to electric heating systems and particularly to all-day water heating systems.

An object of my invention is to provide relatively simple means including a timer and a plural-contact plural-position switch controlled by said timing means to cause energization of a single electric heater on a hot water tank to heat different amounts of water in the tank at different times of a twenty-four hour day.

Other objects of my invention will either be apparent from a description of a system embodying my invention or will be pointed out hereinafter in the course of such description and set forth in the appended claim.

Figure 2:
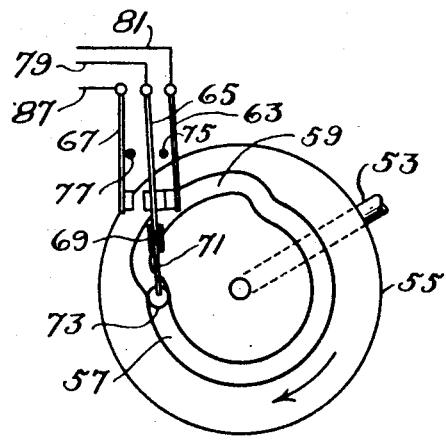

In the drawing,

Figure 1 is a view of a system embodying my invention as applied to an ordinary domestic hot water tank, the latter being shown in vertical section, and, Fig. 2 is a view of a part of the continuously operative timing means shown in a different position than that in which it is shown in Fig. 1 of the drawing.

I have shown a domestic hot water tank 11 having a cold water inlet pipe 13 and a hot water outlet pipe 15 connected with the tank at the bottom and at the top thereof. The tank may be provided with a mass 17 of heat insulating material which may be held in proper operative position by a suitable outer casing 19. I desire to point out that while I have shown a long cylindrical domestic hot water tank, my invention is not limited thereto and further that the tank is shown generally only.

I provide a single electric heater 21 mounted on and around the outside of the lower end portion of the tank and this heater may be mounted in a suitable tunnel 23 as now well known in the art.

I provide a main thermally-actuable heater control switch 25 including a bimetal bar 27 having a fixed end subject to the temperature of the lower portion of the tank and therefore to the temperature of the water in the tank at that point and flexing to engage with and be disengaged from a fixed contact member 29. I provide further an auxiliary thermally actuable heater control switch 31 similar to the main heater control switch 25. This auxiliary thermal switch includes a bimetal bar 33 having a fixed support which is subjected to the temperature of an upper part of the tank and therefore of the water in the tank, this switch including further a fixed contact member 35 adapted to be engaged by and be disengaged from the free end of the flexing bimetal strip 33. I have shown the main and the auxiliary thermally actuable switch schematically only and desire it to be understood that the details of construction of these switches constitute no part of my present invention and that I may use any other thermally actuable type of switch effective for the same purpose as those shown in Fig. 1 of the drawing.

I provide further a continuously operative timing means 37 which includes a synchronous motor 39 of the kind now used in electric clocks. The terminals of the motor winding are connected by wires 41 and 43 to supply circuit conductors 45 and 47 respectively whereby a continuously operative timing means is provided. The shaft of motor 39 may have mounted thereon a worm wheel 49 meshing with a worm gear 51 which worm gear is mounted on a shaft 53. While I have not shown any bearings for shaft 53, I desire it to be understood that such bearings or other supports will be furnished and I desire to point out further that the worm gear 51 is adapted to be driven through one complete revolution every twenty-four hours by means equivalent to the worm and the worm gear shown in Fig. 1.

I mount further a disc 55 on shaft 53 and provide a cam slot in the outer surface of said disc 55, this slot having two portions 57 and 59. Portion 57 extends in the shape of a groove of uniform radius in one face of disc 55, the time extent being substantially sixteen hours and equal to the time length of an on-peak period. The peripheral time extent of portion 59 of the groove having a larger radius is therefore that of an off-peak period of substantially eight hours. It is to be understood that the disc 55 will be so mounted on the shaft 53 that the start of an off-peak period of eight hours may be set for say 10 P. M. so that the end of the off-peak period provided by the constantly operative timing means will be substantially 6 A. M.

I provide a triple-arm switch 61 including a first outer contact or switch arm 63, an intermediate movable switch or contact arm 65 and a second outer contact arm 67. The outer end of switch arm 65 has mounted thereon a small block 69 of electric insulating material into which there projects one end of a bar 71 having secured thereto at its outer end a pin 73, which is adapted to fit into the cam groove comprising the portions 57 and 59. The position of the outer contact arms 63 and 67 is limited by suitably supported stop pins 75 and 77 to the effect that when pin 73 on bar 71 on the intermediate switch arm 65 is in the portion 59 of the groove, contact arms 65 will be in engagement with the outer contact arm 67, as shown in Fig. 1 of the drawing. On the other hand, when pin 73 is in portion 57 of the groove, as shown in Fig. 2 of the drawing, the intermediate contact arm 65 will be in engagement with the outer contact arm 63.

Supply circuit conductor 45 is connected by a conductor 79 with intermediate contact arm 65. Contact arm 63 is connected by a conductor 81 with contact member 35 of the upper or auxiliary thermally-actuable switch 31. The fixed end of bimetal bar 33 is connected by a conductor 83 with the fixed end of the bimetal bar 27 of the main or lower thermally-actuable switch 25 and also to one terminal of the heater 21. The other terminal of heater 21 is connected by conductor 85 with the other supply circuit conductor 47. The fixed contact member 29 of the lower or main thermally-actuable switch 25 is connected by a conductor 87 with the other outer contact arm 67.

At the start of an on-peak period, shown in Fig. 2 of the drawing, the inner or intermediate contact arm 65 has been moved into engagement with the right-hand outer contact arm 63 whereby an energizing circuit through the heater 21 is provided substantially as follows: from supply circuit conductor 45 through conductor 79, contact arms 65 and 63, conductor 81, contact 35, bimetal bar 33, conductor 83, resistor 21 and from there through conductor 85 to the other supply circuit conductor 47. The bimetal bar 33 is shown in the shape it would have if it were subjected to the temperature of hot water in the upper portion of the tank 11 and even though the contact arms 63 and 65 were in engagement with each other, the heater would not be energized as long as the free end of bimetal bar 33 remained out of engagement with the contact member 35 because the thermostat is subjected to the temperature of hot water. Let it be assumed, however, that hot water is withdrawn from the tank 11 one or several times during the on-peak period as defined by the groove 57, then the hereinbefore described energizing circuit through the heater 21 would be effected and heating up of the water in the tank would result. This energization of the heater 21 would continue until a predetermined fractional part of the water contents of the tank had been heated to a desired adjustable relatively high temperature and this amount of water would extend to the position occupied by the upper or auxiliary thermostatic switch 31. Opening of the upper thermally actuable switch 31 would cause deenergization of the heater 21 which would mean that the heater 21 connected to the continuously energized supply circuit and controlled by the plural-arm and plural-operative-position time controlled switch would be deenergized as long as a certain amount of hot water is in the tank.

Should withdrawal of hot water from the tank occur during the day with resultant reclosure of the upper thermal switch 31, reenergization of the heater 21 would occur and would continue until the predetermined fractional part of the water content of the tank had again been heated to a given temperature when deenergization of the heater would occur. It is thus evident that the system embodying my invention would cause the tank to tend to maintain hot a predetermined amount of water in the tank during the on-peak period.

At the start of an off-peak period when the disc 55, turned by the motor 39 in the direction indicated by the arrow, has reached the position shown in Fig. 1 of the drawing where switch arm 65 will have been moved into engagement with switch arm 67, any possible energizing circuit through the switch arm 63 and the upper thermally actuable switch 31 will be opened and another energizing circuit through the heater will be provided substantially as follows: from supply circuit conductor 45, through conductor 79, through contact arms 65 and 67, through conductor 87 to contact 29, through the engaging bimetal bar 27, through heater 21 and from there through conductor 85 to the other supply circuit conductor 45. This means that at the start of an off-peak period in case the tank is not entirely full of hot water, the heater 21 will be energized through the last described energizing circuit and will therefore tend to cause heating up of all of the water in the tank.

I desire to point out that the length of off-peak period is determined by the character of the loads connected to the supply circuit conductors of the public service or utility company and that the energization of the heater 21 through the last above described circuit including the main lower thermal switch 25 will be effected substantially at the beginning of an off-peak period. The energization of the heater through this circuit will continue until all of the water in the tank is hot when the main thermal switch 25 will cause deenergization of the heater.

Should withdrawals of hot water occur during the off-peak period after the heater has been deenergized as above described, the heater will again be energized by the switch 25 and this energization will continue until the end of the off-peak period in case all of the water in the tank has not been heated to the desired high temperature before the end of the off-peak period.

The system embodying my invention therefore provides a plural contact switch having a plurality of operative positions, moved into a selected one of said operative positions by time-controlled means, which may also indicate the time of day, to tend to maintain a predetermined amount of hot water in the tank during the daytime or on-peak hours and to ensure the start of an off-peak period with a tank full of hot water.

Various modifications may be made in the system embodying my invention without departing from the spirit and scope thereof and I therefore desire that all such modifications as are clearly covered by the appended claim shall be included as a part of my invention.

I claim as my invention:

A water heating system for a hot water tank having a single electric heater on said tank near the bottom end thereof, comprising two thermally-actuable heater control switches responsive to tank water temperature at different heights of the tank, a continuously operative timer, a plural-contact switch having two operative positions and adapted to be moved into one and then the other of said operative positions at different periods of a twenty-four hour day and electric connections between the electric heater, the thermally-actuable switches and the plural-contact switch to cause energization of the single heater through the upper thermally-actuable heater control switch during one of said periods of day and to cause energization of the single heater through the lower thermally-actuable heater control switch during the other of said periods of day and to cause deenergization of said single heater when the current-carrying thermal switch is subject to hot water.

CLARK M. OSTERHELD.